Figure 1:
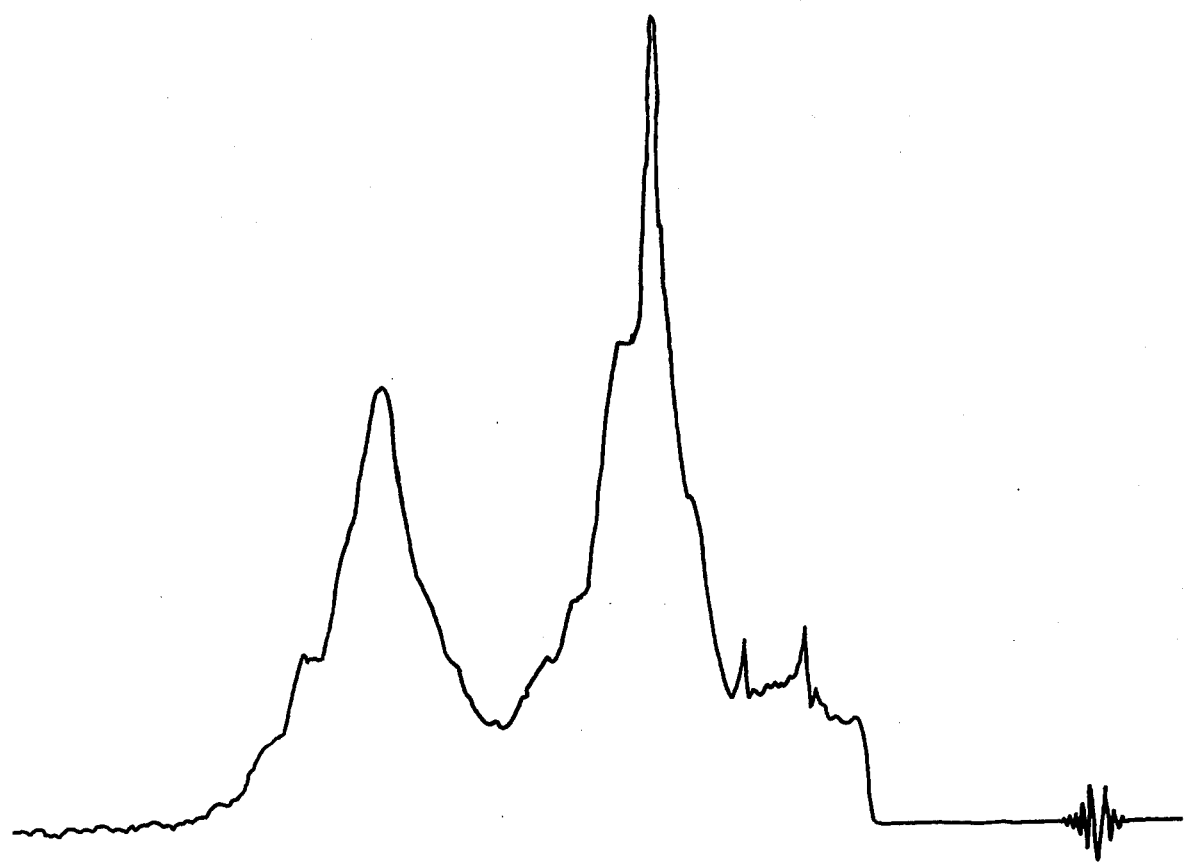

United States Patent [19]

Halasa et al.

[11] 3,931,127

[45] Jan. 6, 1976

[54] CYCLIZED COPOLYMER FROM A CONJUGATED DIENE AND AN ALPHA OLEFIN, AND THE PRODUCTION THEREOF

[75] Inventors: Adel Farhan Halasa, Bath; Tai Chun Cheng, Akron, both of Ohio

[73] Assignee: The Firestone Tire & Rubber Company, Akron, Ohio

[22] Filed: Nov. 19, 1973

[21] Appl. No.: 417,311

[52] U.S. Cl............................ 260/85.3 R; 260/94.6
[51] Int. Cl.² ................... C08F 4/46; C08F 36/04; C08F 236/04
[58] Field of Search .............................. 260/85.3 R

[56] References Cited
FOREIGN PATENTS OR APPLICATIONS
893,463  4/1962  United Kingdom............ 260/85.3 R OTHER PUBLICATIONS
Abstract Papers, American Chemical Society, Meeting Chicago, Sept. 1958, p. 32T.

*Primary Examiner*—Alan Holler

[57] ABSTRACT

A conjugated diene or a mixture of conjugated dienes or a mixture of a conjugated diene and an aryl vinyl monomer is polymerized with an alpha olefin in a reaction which is starved for monomer, and cyclization takes place. The catalyst includes a N,N,N',N'-tetraalkyl alkylene diamine in which each alkyl group contains about 1 to 8 carbon atoms and the alkylene group contains 2 to 10 carbon atoms. N,N,N',N'-tetraethylenediamine is preferred. Other components of the catalyst include metallic sodium or potassium and alkyl sodium or potassium, preferably together with an alkali metal alkoxide.

3 Claims, 2 Drawing Figures

CYCLIZED COPOLYMER FROM A CONJUGATED DIENE AND AN ALPHA OLEFIN, AND THE PRODUCTION THEREOF

The invention relates to polymers and copolymers which include cyclic polymer units and 5 to 50 weight percent of an alpha olefin in the cyclic units. The invention includes the new compounds and their preparation.

The polymer is produced by copolymerization of (a) a conjugated diene which contains 4 to 8 carbon atoms, a mixture of such conjugated dienes or a mixture of such a conjugated diene and an aryl vinyl monomer and (b) 5 to 50 weight percent of an alpha olefin. The conjugated diene units may be polybutadiene, polyisoprene, polypiperylene, polyoctadiene or a mixture of two or more such conjugated dienes, or such a conjugated diene mixed with an aryl vinyl monomer such as styrene alpha-styrene, etc. Such copolymers are well known in the art.

The usual catalyst is metallic sodium or potassium or an alkyl sodium or potassium in which the alkyl group contains 1 to 8 carbon atoms, and ordinarily n-butyl sodium or n-butyl potassium is used. Whether the sodium or potassium is used as metal or alkyl metal, 10 to 50 millimoles is used per 100 parts of conjugated diene. Such alkyl alkali metal catalysts for polymerization of conjugated dienes with or without an aryl vinyl monomer are well known in the art.

As a modifier of the polymerization one uses with the catalyst, a substantially equal molar amount of N,N,N',N'tetraalkylaklylenediamine in which the alkyl group contains about 1 to 8 carbon atoms and the alkylene group contains about 2 to 10 carbon atoms. Such compounds include tetramethylmethylenediamine, tetraethylmethylenediamine, tetramethylethylenediamine (TMEDA), tetraethylethylenediamine, tetraamylbutylenediamine, tetrahexyloctylenediamine, etc. The alkyl and alkylene groups are usually straight chain but may be branched.

The catalyst usually includes a substantially equal molar amount of an alkali metal alkoxide to speed up the reaction. The alkali metal in the catalyst is different from that used as a metal or an alkyl derivative. The alkoxide may be derived from an alkyl group which contains 1 to 8 carbon atoms such as methoxide, ethoxide, butoxide, pentoxide, etc.

The reaction mixture includes an alpha olefin which contains 2 to 8 carbon atoms, such as ethylene, isobutylene, 1-butane, cyclopentene, etc. The polymer may contain 20 to 60 weight percent of olefin units.

The polymerization is carried out using a starved condition of the conjugated diene monomer. Under starved conditions which provide a starved supply the terminal sodium or potassium ion on the conjugated diene attaches itself to the carbon of a double bond in the polymer chain; thus producing a cyclic component which includes from 6 to 18 carbon atoms in alkylene groups, and also groups derived from the olefin. Such compounds, which include an olefin in the cyclic structure, differ from the polymers containing cyclic structures in which there is no such unsaturated element. The principal differences are: this polymer can be thought of as copolymer of an alpha olefin and a cyclic diene in which the olefin is part of the polymer backbone. A distinguishing physical feature of the copolymer is that it is non-shrinking thermoset resin since the total double bonds in the backbone are reduced by the amount of olefins included. Since olefin homopolymers have high melting points, the copolymers of cyclic structures disclosed herein are of low melting point and are less crystalline in nature which gives them good strength and impact resistance on curing with peroxides.

The molecular weight of the polymer produced may be as little as 500 or it may be several thousands, or as great as 100,000 or 200,000 or more. In addition to the cyclized portion of the polymer, it will contain 10 to 15 percent of cis-1,4 polymer, 15 to 25 percent of trans-1,4 polymer and between about 70 to 60 percent of 1,2 polymer. The polymers have broad molecular weight distribution. The vulcanizates of the products containing cyclized polymers of sufficiently high molecular weight may be used where other rubbers are commonly used, as in tires, hose, mechanical goods, etc.

Langer U.S. Pat. No. 3,450,795 uses TMEDA and butyllithium in the polymerization of mixtures of ethylene and butadiene, but does not suggest using starved monomer conditions or describe a cyclized polymer. German Offenlegungsschirft No. 2,063,643 of Lithium Corporation of America, describes in Example 7 the production of cyclized polymer, using n-butyllithium and TMEDA, but uses no olefin. Although the art discloses such cyclization, it utilizes a lithium catalyst component and it is known that lithium-terminated polymers are stable, whereas the corresponding prior art sodium and potassium polymers are unstable and have a greater tendency to cyclize. Furthermore, the yield of the reactions is superior to that known in the prior art.

The results of three different experiments follow. In Example 1, butadiene was cyclized with ethylene. In Examples 2 and 3 no ethylene was present. In Example 2, there was no TMEDA in the catalyst. The analysis of the polymer content of each of the products is given together with Total Found, a measure of the double bonds present in the product, obtained by infra-red analysis.

Example 2 illustrates what is generally known: that n-butyl sodium, alone, gives no cyclization and low conversion of monomer to polymer. The low conversion is evidenced by the high Total Found. Example 3 utilizes TMEDA to modify the action of the n-butyl sodium but no ethylene. High conversion of monomer to polymer (as shown by the amount of solid produced) is due to the presence of the TMEDA, which also produces cyclization, as shown by the lower Total Found. The higher the Total Found (as in Example 2) the less the cyclization that has occurred.

EXAMPLE 1

A catalyst blend of 43.2 mM. of n-butyl sodium and 86.4 mM. of TMEDA was added to 5.10 pounds of a blend of 17% (by weight) of butadiene in hexane over a period of 8 hours under a pressure of 200 pounds of ethylene at 200° F. After the blend addition was completed, the polymer reaction was deactivated by the addition of methanol. The results are recorded in the following table.

| Run No. | 1 | 2 | 3 | 4 |
|---|---|---|---|---|
| DSV, % | .3 | .16 | .27 | .17 |
| cis-1,4, % | 12.1 | 13.7 | 12.5 | 12.8 |
| trans-1,4, % | 16 | 21 | 20.9 | 19.4 |

-continued

| Run No. | 1 | 2 | 3 | 4 |
|---|---|---|---|---|
| 1,2, % | 72 | 65.3 | 66.5 | 67.8 |
| Total Found, % | 71 | 69 | 78 | 78 |

It can be seen from the Total Found that a considerable amount of cyclization was introduced into the polymer. The NMR analysis showed characteristic peaks in the region of 1 to 2 parts per million due to methylene units. The sharpness of these peaks, however, was due to consecutive methylene units which usually appear in the absorption characteristic of polyethylene.

EXAMPLE 2

This example uses no ethylene.

The catalyst consisting of n-butyl sodium, 43 mM., is added to a two-gallon reactor to which 1.92 pounds of a blend of 17% of butadiene in hexane is added during 8 hours under a nitrogen pressure of 200 pounds at 86° F. On completion of the addition, the live cement is deactivated with methanol.

The analysis of the polymer shows that the DSV is 0.19%; cis-1,4 is 13.5%; trans-1,4 is 15.1%; 1.2 is 71.4%; and TOTAL FOUND is 90.5%.

This control experiment showed that with the absence of ethylene, there was low conversion of monomer to polymer, as evidenced by the high TOTAL FOUND which was 90.5%. Very little cyclization was introduced into the polymer. It is significant that the TOTAL FOUND of 90.5% is much greater than that found in the runs of Example 1 in which ethylene was copolymerized with the butadiene. This difference in the TOTAL FOUND may be considered as showing that cyclization occurred in Example 1 in which polyethylene was present and cyclized with the ethylene. The NMR spectra of Examples 1 and 2 are included as FIGS. 1 and 2.

Figure 2:
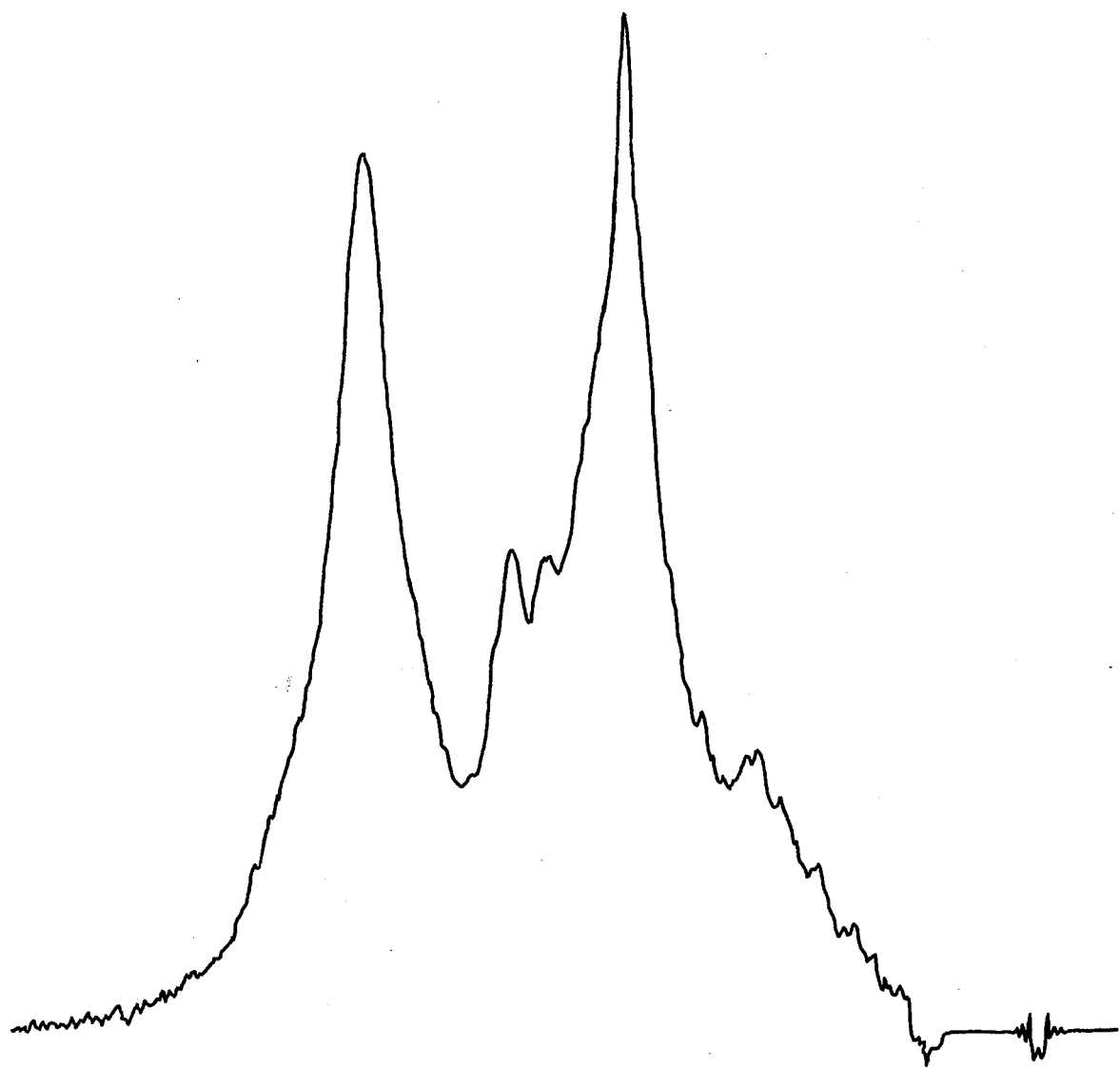

The NMR spectrum of the sample given in FIG. 1 shows cyclized peaks measuring 24% of methylene units; whereas in FIG. 2, based on Example 2 in which no ethylene was present the measure of the methylene units was only 16%. The difference of 8% in the saturation is due to the presence of ethylene during the polymerization.

EXAMPLE 3

This sample uses no ethylene. It uses the same catalyst mixture of n-butyl sodium and TMEDA as was used in Example 1. A blend of 5.21 pounds of butadiene in hexane (17%) is added during 8 hours at 200° F. under 200 pounds of nitrogen. No ethylene is used. The polymer is deactivated with methanol after all the blend is added to the reactor. Results: DSV is .2%; cis-1,4 is 15.5%; trans-1,4 is 21.2%; 1,2 is 63%; and TOTAL FOUND is 71.3%. This drop in the TOTAL FOUND to 71.3% as compared to 90.5% in Example 2, showed good conversion of monomer to polymer, and the NMR spectrum showed characteristic absorptions at 1 and 2 ppm. indicating cyclization of part of the polymer has taken place. Since no ethylene is added to the polymerization, the sharp methylene peaks are absent in the NMR spectrum.

We claim:

1. A cyclized polymer with a molecular weight of substantially 500 to 200,000 which includes substantially 20 to 60 percent of cyclized units having in the cycle 50 to 95 parts by weight of conjugated diene units and 50 to 5 parts by weight of alpha olefin units, each conjugated diene unit containing 4 to 8 carbon atoms and each alpha olefin unit containing 2 to 8 carbon atoms, and in addition to the cyclized portion of the polymer, an uncyclized portion, 10 to 15 percent of which is cis-1,4 polymer, 20 to 25 percent of which is trans-1,4 polymer and between about 70 to 60 percent of which is 1,2-polymer.

2. The process of producing a cyclized polymer which includes cycles of alpha olefin and conjugated diene units, the alpha olefin units containing 2 to 8 carbon atoms and the conjugated diene units containing 4 to 8 carbon atoms, which process comprises polymerizing in solution 5 to 50 weight percent alpha olefin with 95 to 50 percent of a monomer of the class consisting of such conjugated dienes and copolymerizable mixtures of such a conjugated diene and an aryl vinyl monomer, using as a catalyst composition (a) sodium, potassium, alkyl sodium or alkyl potassium in which the alkyl group contains 1 to 8 carbon atoms and (b) an equimolar amount of N,N,N',N'-tetraalkylalkylenediamine in which each alkyl group contains 1 to 8 carbon atoms and each alkylene group contains substantially 2 to 10 carbon atoms, and maintaining the monomer in such starved supply that substantially 20 to 60 percent of the monomer is cyclized.

3. The process of claim 2 in which the catalyst includes a substantially equal molar amount of an alkali metal alkoxide containing 1 to 8 carbon atoms, the alkali metal being different from that present in the alkali metal or alkyl alkali metal used in the catalyst.

* * * * *